US011691622B2

(12) United States Patent
Layer et al.

(10) Patent No.: US 11,691,622 B2
(45) Date of Patent: Jul. 4, 2023

(54) ADAPTIVE LANE-KEEPING ASSISTANT

(71) Applicant: Knorr-Bremse Systeme Fuer Nutzfahrzeuge GmbH, Munich (DE)

(72) Inventors: Hagen Layer, Ilsfeld (DE); Thomas Hackl, Asperg (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 367 days.

(21) Appl. No.: 17/254,368

(22) PCT Filed: Jun. 26, 2019

(86) PCT No.: PCT/EP2019/067046
§ 371 (c)(1),
(2) Date: Dec. 21, 2020

(87) PCT Pub. No.: WO2020/015969
PCT Pub. Date: Jan. 23, 2020

(65) Prior Publication Data
US 2021/0269027 A1    Sep. 2, 2021

(30) Foreign Application Priority Data
Jul. 17, 2018 (DE) .......................... 102018117278.8

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *G06V 20/58* (2022.01); *G06V 20/588* (2022.01);
(Continued)

(58) Field of Classification Search
CPC ............... B60W 30/12; B60W 40/072; B60W 2552/53; B60W 2420/42; G06K 9/00798
See application file for complete search history.

(56) References Cited

U.S. PATENT DOCUMENTS

2003/0097206 A1    5/2003  Matsumoto et al.
2006/0047390 A1*   3/2006  Scherl ................... B60W 30/12
                                                                701/41
(Continued)

FOREIGN PATENT DOCUMENTS

CN    104487318 A    4/2015
CN    104670228 A    6/2015
(Continued)

OTHER PUBLICATIONS

Translation of DE 102010010489 cited by Applicant, to Strauss (Year: 2010).*
(Continued)

Primary Examiner — Kenneth J Malkowski
(74) Attorney, Agent, or Firm — Norton Rose Fulbright US LLP; Gerard Messina

(57) ABSTRACT

An adaptive lane-keeping system for a commercial vehicle, including: an input module for entering sensor data from at least one sensor which is configured to detect the surroundings of the commercial vehicle; an evaluation module for evaluating the sensor data to determine a relative position of the commercial vehicle on a road; a lane-keeping module for controlling a steering system of the commercial vehicle based on a lane-keeping profile that defines a torque to be applied to a steering wheel of the commercial vehicle to support keeping in a lane; and a change module for changing the lane-keeping profile in response to a change in the detected environment. Also described is a related commercial vehicle, method, and computer readable medium.

12 Claims, 5 Drawing Sheets

(51) Int. Cl.
*G06V 20/58* (2022.01)
*G06V 20/56* (2022.01)

(52) U.S. Cl.
CPC ..... *B60W 2300/00* (2013.01); *B60W 2520/30* (2013.01); *B60W 2552/53* (2020.02)

(56) References Cited

U.S. PATENT DOCUMENTS

| | | | | |
|---|---|---|---|---|
| 2016/0229399 | A1* | 8/2016 | Wada | B60W 50/0097 |
| 2017/0061799 | A1 | 3/2017 | Fujii et al. | |
| 2017/0166206 | A1* | 6/2017 | Lim | G06V 20/588 |

FOREIGN PATENT DOCUMENTS

| | | |
|---|---|---|
| CN | 104781125 A | 7/2015 |
| CN | 104943747 A | 9/2015 |
| CN | 105711588 A | 6/2016 |
| CN | 107672592 A | 2/2018 |
| DE | 19830548 A1 | 2/1999 |
| DE | 102005004727 A1 | 8/2006 |
| DE | 102008001105 A1 | 10/2009 |
| DE | 102010010489 A1 | 10/2011 |
| DE | 102011011714 A1 | 8/2012 |
| DE | 102011013690 A | 1/2014 |
| DE | 112013004433 T5 | 6/2015 |
| EP | 1621449 A2 | 2/2006 |
| EP | 1726513 A1 | 11/2006 |
| JP | H11189166 A | 7/1999 |
| WO | 2013187825 A1 | 12/2013 |

OTHER PUBLICATIONS

International Search Report dated Sep. 20, 2019 for PCT/EP2019/067046.

* cited by examiner

ADAPTIVE LANE-KEEPING ASSISTANT

FIELD OF THE INVENTION

The present invention relates to an adaptive lane keeping system and a method for adaptively keeping a commercial vehicle in a lane and in particular to an adaptive lane-keeping assistant.

BACKGROUND INFORMATION

Driver assistance systems are becoming increasingly important—especially in view of the increase in autonomous driving. With lane-keeping systems, a driver is given a torque on the steering wheel based on environmental analyses. This is accompanied by a resistance which the driver feels at the steering wheel as a counter-force and which the driver must overcome in order to change, for example, a direction of travel of the vehicle in opposition to the inputs of the lane-keeping system. If the driver yields to this torque, the vehicle autonomously steers onto a predetermined driving line.

Simple lane-keeping systems evaluate line information for this purpose. For example, cameras can be used to detect continuous (right or left) lane boundary lines or dashed lane separation lines. Such lines are usually easy to detect by cameras and the system can maintain a predetermined distance from the specifically detected line.

Especially in the field of commercial vehicles, however, the dimensions of the vehicles vary considerably, so that conventional lane-keeping systems, for example from the field of passenger cars, are often unsuitable to give the driver a feeling of safety. It happens again and again that the lane-keeping system used leads to critical situations, especially for large commercial vehicles, because the system steers too far in one direction or the other.

There is therefore a need for lane-keeping systems which can be used in particular for various commercial vehicles and which offer a high degree of safety.

SUMMARY OF THE INVENTION

At least some of the above problems may be solved by an adaptive lane-keeping system according to the description herein, a commercial vehicle according to the description herein and a method according to the description herein. The further descriptions herein define further advantageous embodiments of the subject matter of the main descriptions herein.

The present invention relates to an adaptive lane-keeping system with an input module, an evaluation module, a lane-keeping module, and a change module. The input module is configured for entering sensor data from at least one sensor, which is configured to detect an environment (or surroundings) of the commercial vehicle. The evaluation module is configured for evaluating the sensor data in order to determine a relative position of the commercial vehicle on a road. The lane-keeping module is configured to control a steering system of the commercial vehicle based on a lane-keeping profile, which defines a torque to9 be applied to a steering wheel of the commercial vehicle to support keeping in a lane. The change module is configured to change the lane-keeping profile in response to a change in the detected environment.

The adaptive lane keeping system is particularly suitable for commercial vehicles, although it should not be limited to commercial vehicles. It can also be used for other vehicles.

The term "lane-keeping profile" defines a relationship (for example, a continuous or discrete function or assignment, a tabular assignment, etc.) between a torque acting on the steering wheel (in particular the absolute amount thereof) and a position of the vehicle perpendicular to the direction of travel. The lane-keeping profile may include in particular a linear or nonlinear assignment of torques to a position of the commercial vehicle perpendicular to the direction of travel. A linear assignment is characterized by a constant gradient, while a nonlinear assignment has a position-dependent gradient. The lane-keeping profile can also be linear in sections, with the gradient suddenly changing at certain locations.

The applied torque is intended to cause a driver to cause a correction of the vehicle position or to perform this itself if the driver himself is not exerting torque on the steering wheel. For example, if the position of the vehicle changes and drifts to the right or left, for example, the torque acts on the steering wheel and thus on the steering to correct the position of the vehicle. The force associated with the torque is introduced into the steering system at different positions as long as this force is felt as torque on the steering wheel by the driver. For example, the adaptive lane-keeping system controls a steering actuator of the steering system depending on the position of the commercial vehicle. For deviations of the vehicle to the right or left, the introduced torque has different signs (acts in opposite directions). The absolute amount of torque has a minimum that defines a driving line (except for a tolerance of ±10%) to which the vehicle automatically steers if the driver does not intervene. The driving line can therefore correspond to a driver's request.

Various sensors can be used for position determination or all-round detection, such as radar systems, lidar systems, ultrasonic systems, infrared sensors, or other sensors that may already be present in the vehicle.

Optionally, the change module is configured to change the lane-keeping profile depending on a lane width. The change module can flatten the lane-keeping profile in a central lane area (especially for wider lanes). For example, the central region represents a minimum of the amount of torque to be introduced. The flattened central region can increase with the lane width, wherein over the entire flattened area, the introduced torque increases only marginally or is even zero (the increase can be smaller by at least 50% there than outside the flattened area, for example).

Optionally, the change module is configured to learn a driving line of the commercial vehicle based on a driver's request. For example, the change module may be configured to set the desired driving line by an input from the driver and/or according to continuous control of the commercial vehicle along the desired driving line by the driver. The lane-keeping system can learn this desired driving line, for example, by the driver continuing to drive along a certain driving line. For example, for a period of time (for example, 30 seconds or a few minutes or even longer), the system can determine the average position of the commercial vehicle on the corresponding road and can set one of the driving lines to the mean value. A gradual approach can also be carried out to avoid sudden major changes.

Optionally, the evaluation module is configured to detect at least one obstacle in the surroundings of the commercial vehicle. On detecting an obstacle in the surroundings of the commercial vehicle, the change module may accordingly change the lane-keeping profile depending on a position of at least one obstacle. The at least one obstacle may include, for example, one or more of the following obstacles: a curb, a guardrail, another vehicle, an oncoming vehicle, a construction site boundary, a tree, a tunnel, etc. The change module is, for example, configured to further increase the lane-keeping profile (for example, the gradient) towards the at least one obstacle.

It is also possible that the lane-keeping module is configured to stop or interrupt the control of the steering system when the evaluation module has detected an oncoming vehicle as an obstacle. It can thus be ensured that the lane-keeping system is only used under certain conditions (for example, only where there is no oncoming traffic). In this case, appropriate information can be given to the driver to inform him of the deactivation.

In addition, the commercial vehicle may provide vehicle-related data (static or dynamic), in particular vehicle dimensions, vehicle speed, a current or expected curve, a position and/or an imminent change of direction (for example using a navigation system). In this case, the change module can be configured to take into account the vehicle-related data when changing the lane-keeping profile.

The present invention also relates to a commercial vehicle with a steering system, a steering wheel, at least one sensor and a lane-keeping system as previously described. Optionally, the steering system of the commercial vehicle may have a hydraulic steering actuator and may include at least one sensor: a camera, a radar, a lidar, an ultrasonic sensor or other sensors, which are suitable for detecting the surroundings of the commercial vehicle.

The present invention also relates to a method for adaptively keeping a commercial vehicle in a lane. The method includes the following steps:

Receiving sensor data from at least one sensor which is configured to detect the surroundings of the commercial vehicle;

Evaluating the sensor data to determine a relative position of the commercial vehicle on a road;

Controlling a steering system of the commercial vehicle based on a lane-keeping profile that defines a torque to be applied to a steering wheel of the commercial vehicle to support keeping in a lane; and Changing the lane-keeping profile in response to a change in the detected surroundings.

This method, or at least parts thereof, may also be implemented or stored in the form of instructions in software or on a computer program product, wherein stored instructions are able to perform the steps according to the method when the method is running on a processor. Therefore, the present invention also relates to a computer program product with software code stored on it (software instructions), which is configured to perform one of the previously described methods when the software code is executed by a processing unit. The processing unit can be any form of computer or control unit that has an appropriate microprocessor that can execute software code.

Exemplary embodiments of the present invention solve at least some of the above mentioned problems by an adaptive lane-keeping system analyzing the environmental data and calculating or correcting a lane-keeping profile (torque-position profile). The lane-keeping profile can thus be adapted dynamically. A major advantage of the exemplary embodiments is that the driving feel and thus also the acceptance by the driver is improved by the adaptive lane-keeping system.

The exemplary embodiments of the present invention are better understood by the following detailed description and the enclosed drawings of the different exemplary embodiments, which should not be understood, however, in such a way that they limit the disclosure to the specific embodiments but serve only for explanation and understanding.

DETAILED DESCRIPTION

Figure 1:
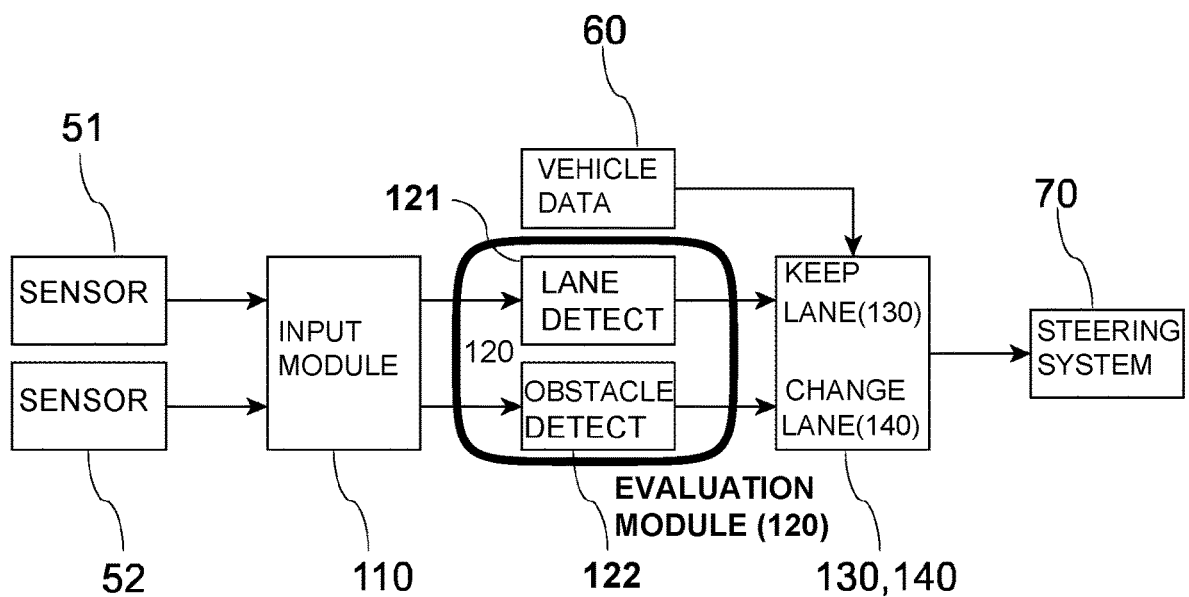
FIG. 1 shows an adaptive lane-keeping system according to an exemplary embodiment of the present invention.

FIG. 1 shows an adaptive lane-keeping system according to an exemplary embodiment of the present invention. The lane-keeping system is particularly suitable for commercial vehicles but is not restricted thereto and can also be used for other vehicles. The lane-keeping system comprises an input module 110 for entering (or receiving) sensor data of at least one sensor 51, 52, an evaluation module 120 for evaluating the sensor data to determine a relative position of the commercial vehicle on a road, and a lane-keeping module 130 for controlling a steering system 70 of the exemplary commercial vehicle. The steering system is controlled based on a lane-keeping profile and results in a torque on the steering wheel, which can be felt by the driver. In addition, the lane-keeping system includes a change module 140 for changing the lane-keeping profile. Changes can be made automatically in the event of a change in the detected environment (surroundings of the vehicle) or also in the event of a driver's request (for example, an input).

The lane-keeping profile defines the torque that is applied to the steering wheel of the commercial vehicle to support lane keeping. The sensor includes, for example, a camera 51 and/or a radar 52, which are equipped for the detection of the surroundings of the commercial vehicle. The evaluation module 120 comprises, for example, a lane detection unit 121 and/or an obstacle detection unit 122. In addition, in the embodiment shown, the lane-keeping module 130 and the change module 140 are implemented by way of example in a unit, which can also access vehicle data 60. The vehicle data include, for example, static data (dimensions, type, load status, etc.) or dynamic vehicle data (speed, cornering, data from a navigation system, etc.). The steering system 70 is accordingly controlled based on the lane-keeping profile, so that adaptively an additional torque is applied to the steering wheel (in addition to a torque applied by the driver) in order to persuade the driver of a certain correction.

The modules 110, 120, 130, 140 shown may be partially or completely housed in one or more vehicle control units. They may also be implemented by software to perform the defined functions.

Figure 2A:
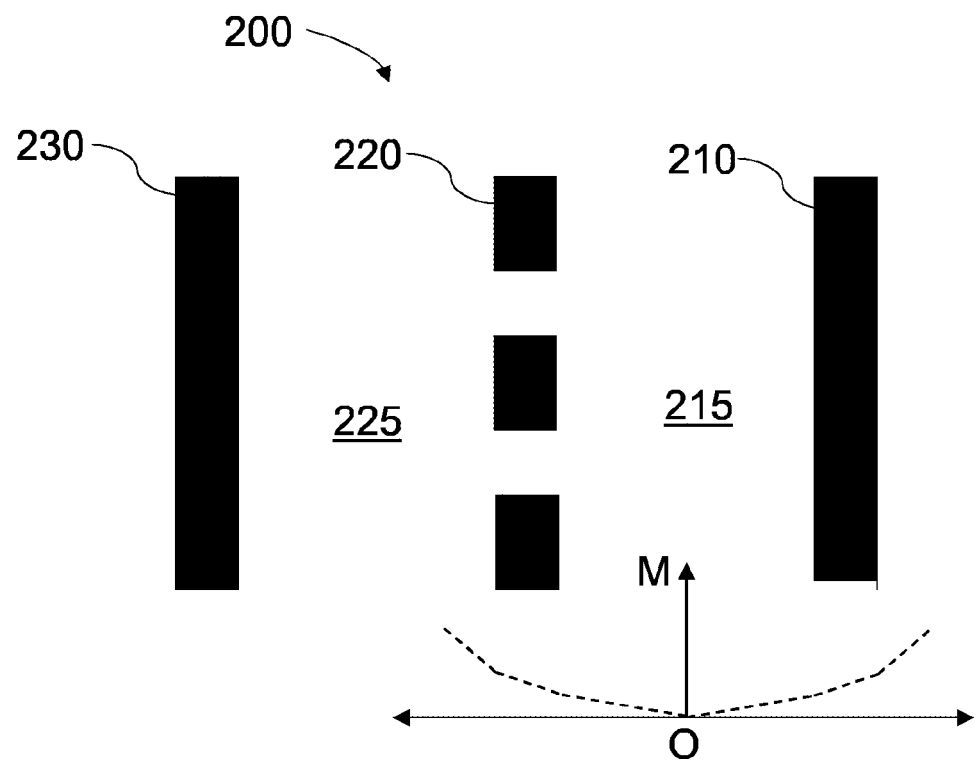
FIGS. 2A and 2B illustrate the behavior of the lane-keeping system based on a static or dynamic lane-keeping profile according to exemplary embodiments of the present invention.

FIG. 2A shows by way of example an exemplary embodiment of the behavior of the lane-keeping system for keeping the vehicle on a driving line O while driving. The driving line O is, for example, a central position on a first lane 215 of a street or a road 200, which may also have a second lane 225. The first lane 215 is for example on the right, bounded by a first boundary line 210. Between the first lane 215 and the second lane 225 there is a lane separation line 220 in the form of a dashed line. The second lane 225 is bounded by a left boundary line 230 as a solid line.

Below the first lane 215 an exemplary lane-keeping profile is shown. As already explained, the lane-keeping profile represents a functional relationship between a torque M, which acts on a steering wheel of the vehicle, and a position of the vehicle perpendicular to the direction of travel. The torque M is applied by the lane-keeping module 130 to the steering system 70 so that the driver feels the torque M on the steering wheel. For the desired driving line O (for example, a central position) it is zero and rises to the right and left thereof, wherein it acts in different directions. Since the torque M applied to the steering wheel changes its sign at the driving line O, the torque M shown is an absolute amount of the acting torque.

In the example of FIG. 2A, the driving line O is approximately in the geometric center of the first lane 215. If the vehicle moves to the right or to the left from this driving line O, the applied torque M acts in such a way that the vehicle is automatically returned to the driving line O—at least as long as the driver does not intervene.

The gradient of the applied torque M can be linear or nonlinear. For example, the controlled torque M increases linearly near the driving line O. Near the right boundary line 210 or the lane separating line 220, however, the torque increases significantly more. The gradient can be stronger the further away the position is from the driving line O. The driver clearly feels this.

Often, however, the geometric center is not the desired position that a driver would prefer—also in terms of a specific driving situation and lane width—and where he feels safe. Therefore, exemplary embodiments also allow the driving line O to be learned by the lane-keeping system, so that the change module adjusts the driving line O to a position that, according to the driver, would ideally be adhered to by the vehicle.

Figure 2B:
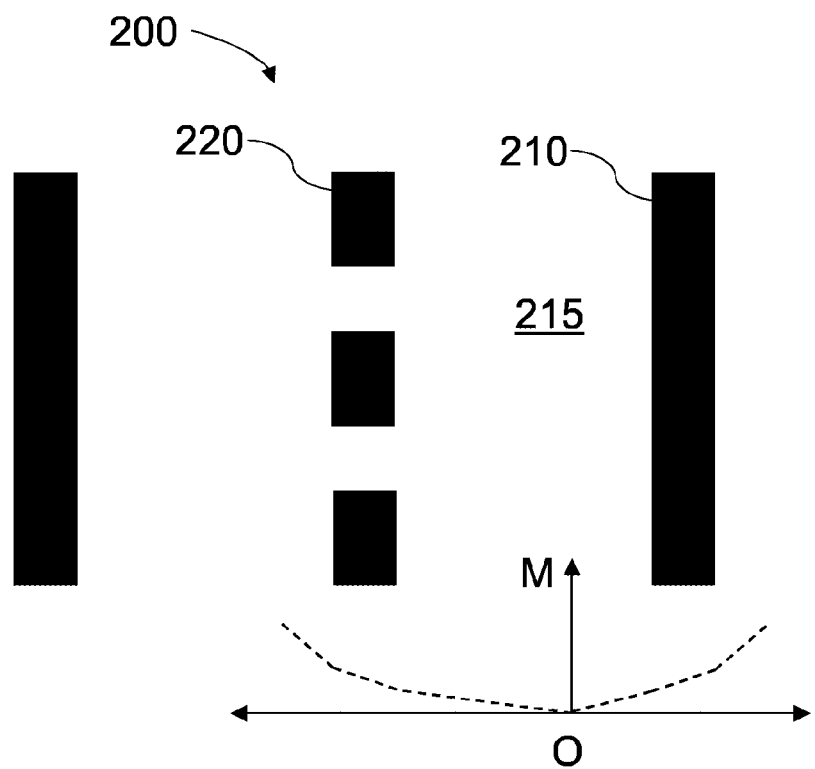

FIG. 2B shows an exemplary embodiment of such a lane-keeping system, in which the driving line O is automatically learned by the system. In the embodiment shown, the driving line O is not arranged in the geometric center of the first carriageway 215, but further shifted towards the right lane boundary 210. As a result of the shift, the applied torque M increases more strongly towards the right-hand lane boundary 210 than towards the lane separating line 220.

For example, learning the driving line O can be done in such a way that the driver continues (for example, for a specified minimum duration) to maintain a certain distance from the right-hand lane boundary 210 (or lane separating line 220). The lane-keeping system can then meet this driver's wish and move the minimum lane-keeping profile to this position, thereby yielding to the driver's wish. It is also possible that the desired driving line O is set by a corresponding input of the driver. The predetermined duration can be 10 s, 30 s, 60 s or more, for example. It is also possible that the desired driving line O is learned by evaluation of a previous longer driving period (for example, a few hours or days). Thus, the system can analyze vehicle positions in a past period and automatically set a resulting average value.

In this way, exemplary embodiments can ensure that each driver can drive along his own driving line O—at least as long as there is no risk of collision with obstacles. In this way, the driver obtains a high level of safety.

While the lane-keeping profile from FIG. 2A can be considered static (regardless of the actual behavior of the driver), the lane-keeping profile from FIG. 2B can dynamically adapt to the driver's request. The shift of the driving line O from the central position towards the right-hand lane boundary 210 is particularly advantageous for narrow roads, in order to ensure that oncoming vehicles can be safely avoided. Both, however, are adaptive because they depend on the vehicle environment.

Figure 3B:
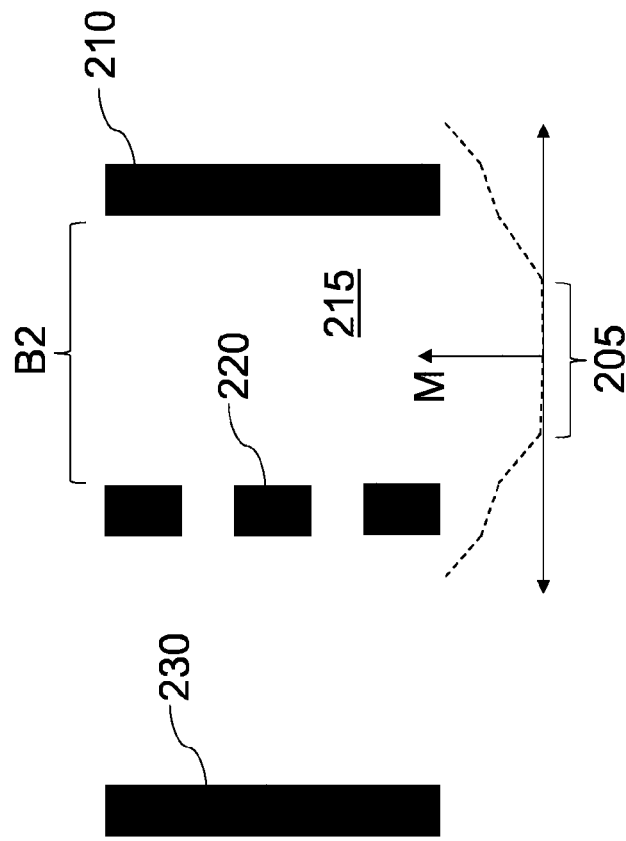
FIGS. 3A and 3B show by way of example the adjustment of the lane-keeping profile depending on the lane width according to further exemplary embodiments.
Figure 3A:
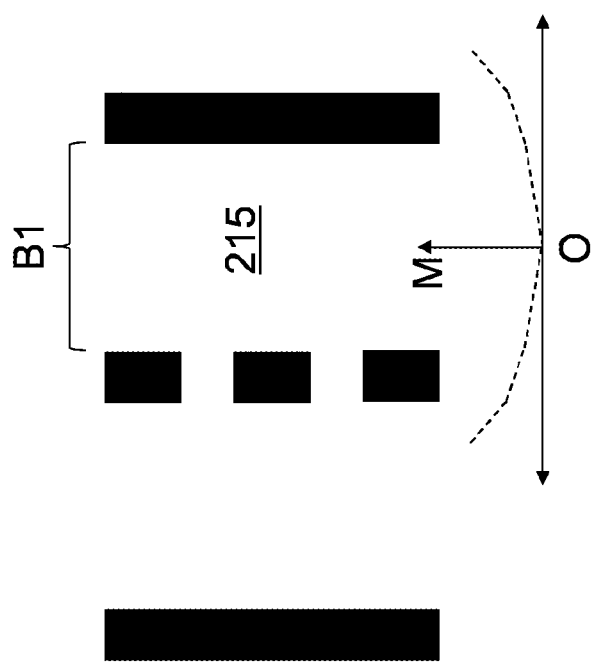

FIGS. 3A and 3B show by way of example the adjustment of the lane-keeping profile depending on a lane width B1, B2 according to further exemplary embodiments. FIG. 3A shows a lane 215 with a smaller lane width B1, while FIG. 3B shows a lane 215 with a greater lane width B2.

The lane width B1, B2 can be determined by sensors 51, 52, wherein it is often sufficient to determine only a widening or a reduction in the lane width. The lane-keeping profile for the wider lane from FIG. 3B is changed in such a way that it remains flat at first and only rises more strongly near the right-hand edge 210 of the road or the lane separation line 220. For a wider lane 215, therefore, the lane-keeping profile may be flattened in a central region 205, so that no torque M acts here or the gradient is only marginal. For example, the gradient in the central region 205 can be chosen in such a way that it is at least 50% less than the gradient outside the central region 205 or for the narrower lane 215 of FIG. 3A.

For example, the width of the central region 205 can be selected depending on the lane width B2. In addition, the central region 205 only needs to be formed by a certain minimum lane width.

In general, the applied torque M increases more and more towards the boundary lines 210, 220 and the lane separation line 220. However, it is also possible that the gradient may be smaller or larger or may sometimes be constant. For example, using the lane-keeping system when leaving the flattened area 205 can initially be very powerful, in order to clearly inform the driver of the adaptive lane control. However, as FIG. 3B further shows, the applied torque can then remain almost constant (may only slightly increase) in order to allow the driver easy control over large parts of the first lane 215. The applied torque M rises again significantly only in the critical area when crossing the boundary lines 210, 220 or the lane separation line 220, so that the driver clearly feels the danger.

Figure 4A:
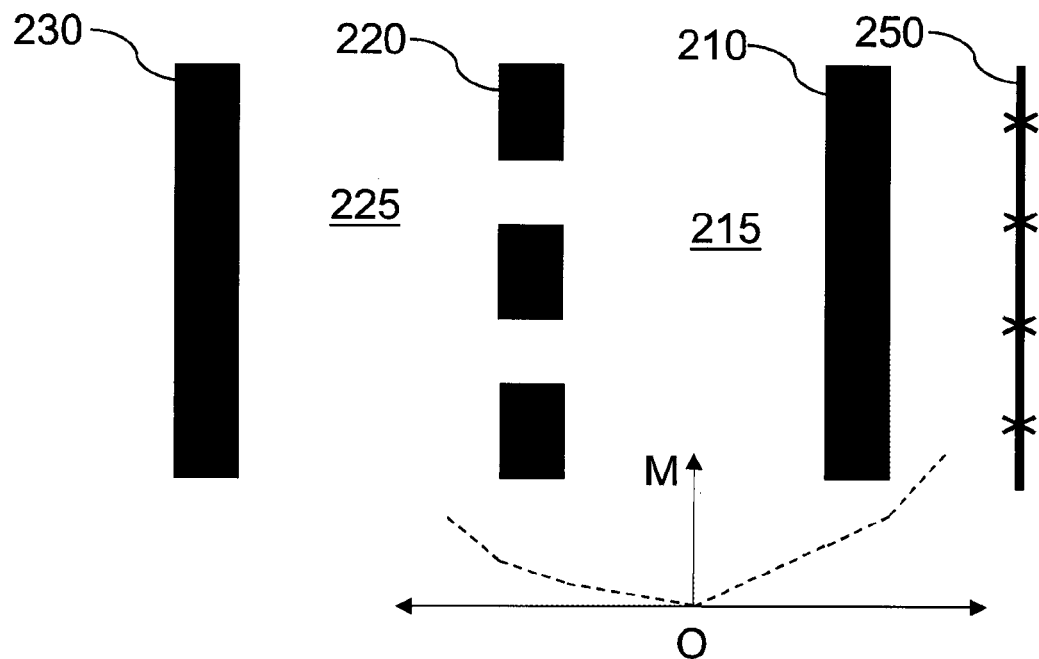
FIGS. 4A and 4B show exemplary embodiments in which the lane-keeping profile is changed depending on obstacles or particular surroundings.
Figure 4B:
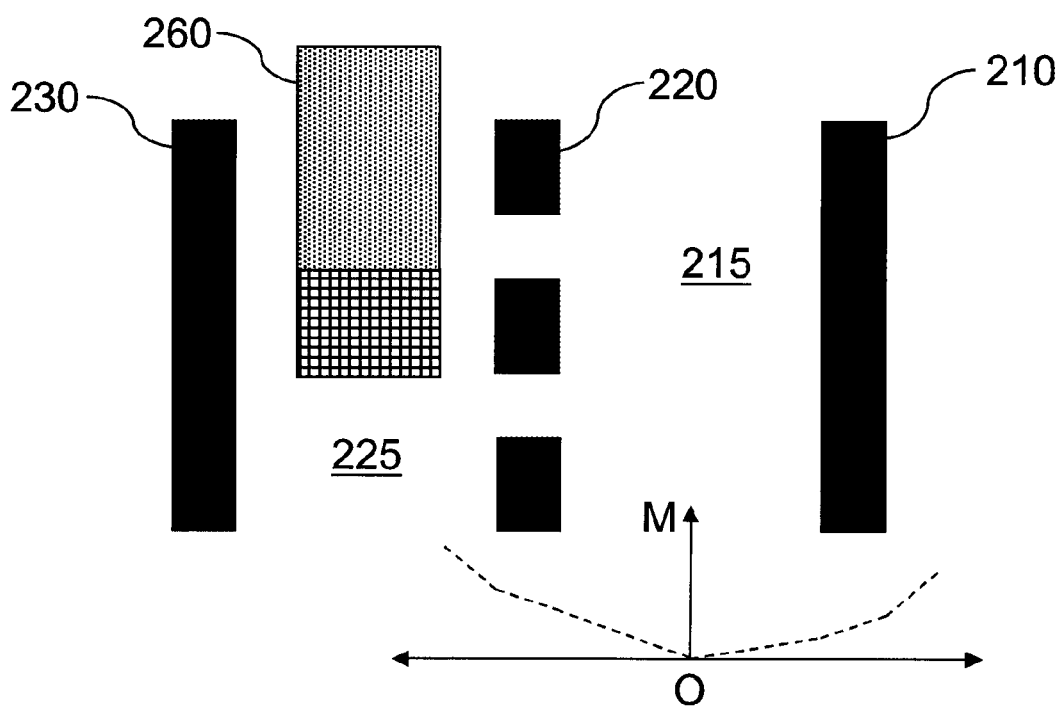

FIGS. 4A and 4B show exemplary embodiments in which the lane-keeping profile is changed depending on obstacles or other objects in the environment, wherein the obstacles can be detected, for example, by the sensors 51, 52 or even obtained from other information sources such as a navigation device.

FIG. 4A shows, for example, that a guardrail or other side boundaries 250 (for example, also trees or construction site boundaries) are present on the right side as an obstacle. In FIG. 4B, the obstacle is an oncoming vehicle 260 in the second lane 225. In both cases, the lane-keeping profile can be changed depending on the detected objects 250, 260.

In FIG. 4A, based on the detected side boundary 250, the lane-keeping profile is changed in such a way that the vehicle does not get near the side boundary 250. This can be achieved by increasing the gradient of the torque curve of the lane-keeping profile towards the side boundary 250, so that a stronger torque M acts on the steering wheel when the driver drives in the direction of the exemplary guardrail 250. This stronger counter-force (compared to the case if there were no guardrail 250) can be chosen in such a way that it is clearly perceptible to a driver (for example. increased by at least 10% or 40%).

FIG. 4B shows an exemplary embodiment according to which the lane-keeping profile is changed depending on any oncoming traffic 260. For example, on detecting an oncoming vehicle 260, the lane-keeping profile can be changed in such a way that a sufficient distance from the oncoming vehicle 260 is ensured. Again, the lane-keeping profile can be changed in such a way that the applied torque M or the force is increased in the event of a change of direction towards oncoming traffic, while it drops significantly in the opposite direction (as if there were no oncoming traffic; for example, increased by at least 10% or 40%). A driver will in turn clearly perceive this and thus be informed of the danger.

It is also possible according to exemplary embodiments that the detection of an oncoming vehicle 260 causes the lane-keeping system to deactivate itself. In this case, a corresponding notification can be issued to the driver. This is particularly useful if the lane-keeping system is only intended for lanes where the vehicles move in the same direction on adjacent lanes (for example, on motorways).

It is also possible that additional dynamic or static vehicle data can be used to change the lane-keeping profile. This vehicle data are for example the speed or cornering or the position of the vehicle. Map material can also be evaluated in order to make corresponding changes to the lane-keeping profile in advance depending on the specific driving situation.

Figure 5:
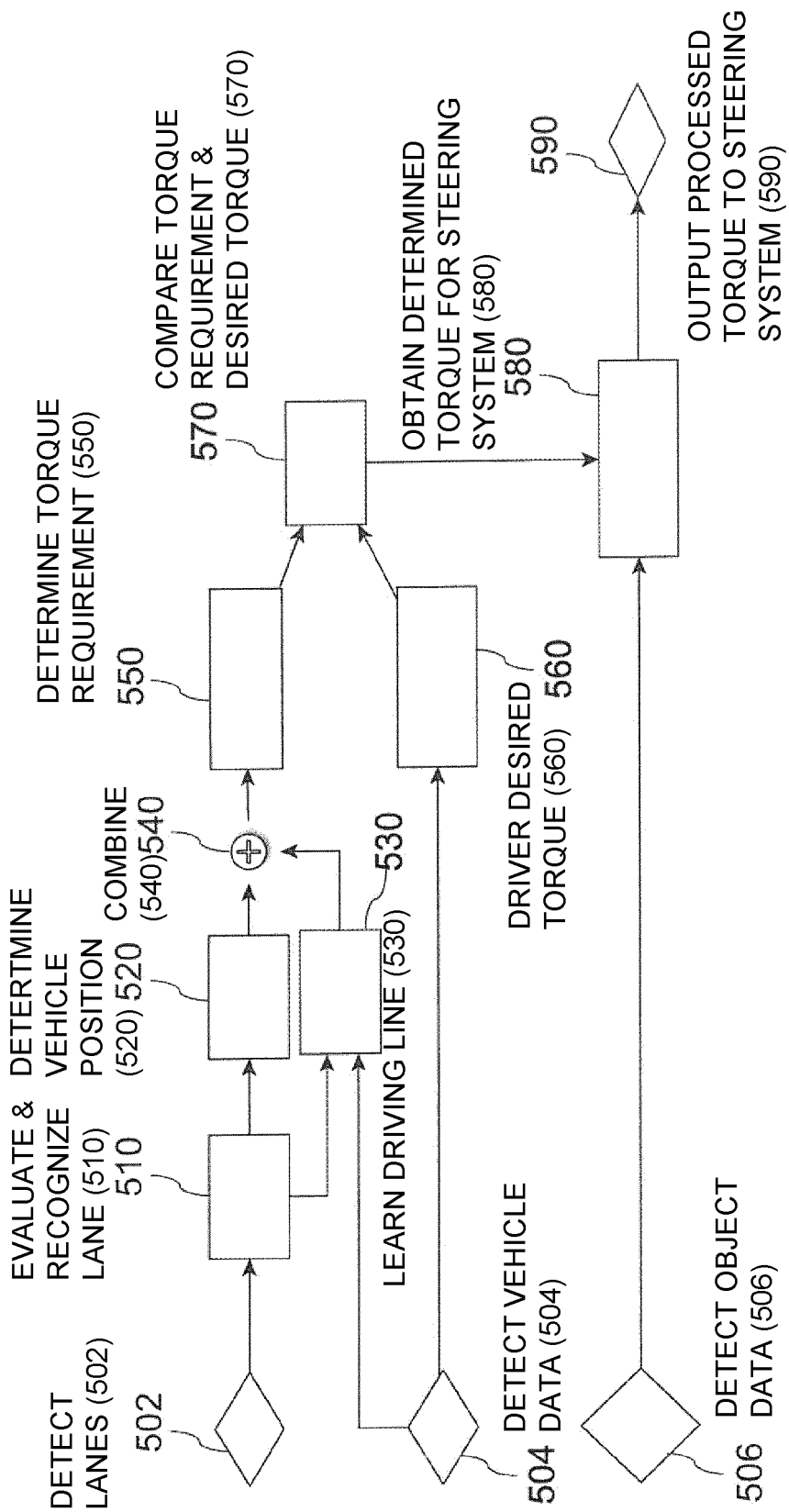
FIG. 5 shows a flowchart for adaptive adjustment of the lane-keeping profile according to exemplary embodiments of the present invention.

FIG. 5 shows by way of example a flowchart for the adaptive adjustment of the lane-keeping profile and a corresponding intervention in the steering system of the commercial vehicle.

First, the system detects various environmental data. This includes, for example, detection of the lane lanes (step 502), a possible detection of vehicle data (step 504) and the adaptive detection of object data (step 506). After the lanes have been detected, an evaluation and recognition of at least one lane can be carried out (step 510). During this evaluation, a vehicle position determination can be made (step 520). In addition, the vehicle data and the selected lane can be used by the system to learn a driving line O (step 530). The position determination and the optional learning of the driving line O according to the driver's wish can be first combined (step 540) and then processed into a torque requirement (step 550), which is then to be applied to the steering system accordingly.

At the same time, the system also takes into account a driver requirement (step 560) which is compared with the determined torque requirement from step 550 (step 570). The comparison determines which torque requirement is greater, the torque requirement determined by the system or the one desired by the driver, which can then be output. The result is passed on to the steering system (step 580). For example, if the driver requirement is strong enough, the system follows the driver requirement. However, if the driver's requirement is weaker and the driver therefore yields to the torque calculated by the system, the system follows the calculated torque. The adaptive steering system can also process the adaptive object data (step 506), for example regarding an obstacle. The output is carried out to the steering system (step 590) and leads to a change of direction of the vehicle.

The method can also be computer-implemented, i.e. it can be implemented by instructions stored on a memory medium which are able to perform the steps of the method when it is running on a processor. The instructions typically include one or more statements, which may be stored in different ways on different media in or peripheral to a control unit (with a processor) which, when read and executed by the control unit, cause the control unit to perform functions, functionalities and operations necessary to perform a method according to the present invention.

The features of the invention disclosed in the description, the claims and the figures may be essential for the realization of the invention both individually and in any combination.

THE REFERENCE CHARACTER LIST IS AS FOLLOWS

51 Camera
52 Radar
60 Vehicle data
70 Steering system
110 Input module
120 Evaluation module
121 Lane detection unit
122 Obstacle detection unit
130 Lane-keeping module
140 Change module
200 Road
205 Flattened region of the lane-keeping profile
210 Right boundary lines
215 First lane
225 Second lane
220 Lane separating lines
230 Left boundary line
250, 260 Obstacles
502, 504, . . . Steps of the method
B1, B2 Lane widths
O Driving line

The invention claimed is:

1. An adaptive lane-keeping system for a commercial vehicle, comprising:
 a non-transitory computer readable medium having a computer program, which is executable by a processor, including a program code arrangement having program code for adaptively keeping commercial vehicles in a lane, by performing the following:
  entering, via an input module, sensor data from at least one sensor which is configured to detect the surroundings of the commercial vehicle;
  evaluating, via an evaluation module, the sensor data and determining a position of the commercial vehicle on a road;
  controlling, via a lane-keeping module, a steering system of the commercial vehicle based on a lane-keeping profile that defines a torque to be applied to a steering wheel of the commercial vehicle to support keeping in a lane; and
  changing, via a change module, the lane-keeping profile for a change in the detected environment;
  wherein in a comparison, a desired torque of the driver is compared with a determined torque requirement, wherein the comparison determines whether the torque requirement determined by the system or the torque desired by the driver is greater, and wherein a resulting torque, obtained from the comparison, is provided to the steering system, wherein the steering system includes an adaptive steering system that processes adaptive object data and a resulting adapted toque is output to the steering system and leads to a change of direction of the vehicle.

2. The lane-keeping system of claim 1, wherein the lane-keeping profile is changed for a changed a lane width.

3. The lane-keeping system of claim 2, wherein the lane-keeping profile is changed in a central region of the lane for an amount of torque, which is being controlled, that is reduced, and wherein the changed central region increases with the lane width.

4. The lane-keeping system of claim 1, wherein a driving line of the commercial vehicle is learned based on a driver's request.

5. The lane-keeping system of claim 4, wherein the driving line is set by an input by the driver and/or according to continuous control of the commercial vehicle by the driver along a desired line.

6. The lane-keeping system of claim 1, wherein at least one obstacle is detected in the surroundings of the commercial vehicle and the lane-keeping profile is changed for a particular position of the at least one obstacle on detecting the at least one obstacle in the surroundings of the commercial vehicle.

7. The lane-keeping system of claim 6, wherein the at least one obstacle includes one or more of the following obstacles: a curb, a guardrail, another vehicle, an oncoming vehicle, a construction site boundary, a tree, or a tunnel.

8. The lane-keeping system of claim 1, wherein the commercial vehicle provides vehicle-related data, including a vehicle speed, cornering, a position and/or an imminent change of direction, and wherein the change module takes into account the vehicle-related data for a changed lane-keeping profile.

9. A commercial vehicle with a steering system, at least one sensor and a steering wheel, comprising:
an adaptive lane-keeping system, including: a non-transitory computer readable medium having a computer program, which is executable by a processor, including a program code arrangement having program code for adaptively keeping commercial vehicles in a lane, by performing the following:
entering, via an input module, sensor data from at least one sensor which is configured to detect the surroundings of the commercial vehicle;
evaluating, via an evaluation module, the sensor data and determining a position of the commercial vehicle on a road;
controlling, via a lane-keeping module, a steering system of the commercial vehicle based on a lane-keeping profile that defines a torque to be applied to a steering wheel of the commercial vehicle to support keeping in a lane; and
changing, via a change module, the lane-keeping profile for a change in the detected environment;
wherein in a comparison, a desired torque of the driver is compared with a determined torque requirement, wherein the comparison determines whether the torque requirement determined by the system or the torque desired by the driver is greater, and wherein a resulting torque, obtained from the comparison, is provided to the steering system, wherein the steering system includes an adaptive steering system that processes adaptive object data and a resulting adapted toque is output to the steering system and leads to a change of direction of the vehicle.

10. The commercial vehicle as claimed in claim 9, wherein the steering system of the commercial vehicle includes a hydraulic steering actuator.

11. A method for adaptively keeping commercial vehicles in a lane, the method comprising:
receiving sensor data from at least one sensor which is configured to detect the surroundings of the commercial vehicle;
evaluating the sensor data and determining a position of the commercial vehicle on a lane;
controlling a steering system of the commercial vehicle based on a lane-keeping profile that defines a torque to be applied to a steering wheel of the commercial vehicle to support keeping in a lane; and
changing the lane-keeping profile for a change in the detected environment;
wherein in a comparison, a desired torque of the driver is compared with a determined torque requirement, wherein the comparison determines whether the torque requirement determined by the system or the torque desired by the driver is greater, and wherein a resulting torque, obtained from the comparison, is provided to the steering system, wherein the steering system includes an adaptive steering system that processes adaptive object data and a resulting adapted toque is output to the steering system and leads to a change of direction of the vehicle.

12. A non-transitory computer readable medium having a computer program, which is executable by a processor or data processing unit, comprising:
a program code arrangement having program code for adaptively keeping commercial vehicles in a lane, by performing the following:
receiving sensor data from at least one sensor which is configured to detect the surroundings of the commercial vehicle;
evaluating the sensor data and determining a position of the commercial vehicle on a lane;
controlling a steering system of the commercial vehicle based on a lane-keeping profile that defines a torque to be applied to a steering wheel of the commercial vehicle to support keeping in a lane; and
changing the lane-keeping profile for a change in the detected environment;
wherein in a comparison, a desired torque of the driver is compared with a determined torque requirement, wherein the comparison determines whether the torque requirement determined by the system or the torque desired by the driver is greater, and wherein a resulting torque, obtained from the comparison, is provided to the steering system, wherein the steering system includes an adaptive steering system that processes adaptive object data and a resulting adapted toque is output to the steering system and leads to a change of direction of the vehicle.

\* \* \* \* \*